United States Patent [19]
Heitmann et al.

[11] Patent Number: 5,170,640
[45] Date of Patent: Dec. 15, 1992

[54] OIL SEPARATOR

[75] Inventors: Erric L. Heitmann, Liverpool; David N. Shaw, Syracuse, both of N.Y.; Arthur G. Mensing, Bolton, Conn.; Michael G. Field, Fabius, N.Y.

[73] Assignee: Carrier Corporation, Syracuse, N.Y.

[21] Appl. No.: 664,168

[22] Filed: Mar. 4, 1991

[51] Int. Cl.⁵ ............................... F25B 43/02
[52] U.S. Cl. ........................ 62/470; 62/512; 55/337
[58] Field of Search .............. 62/467, 470, 473, 474, 62/512; 55/337

[56] References Cited

U.S. PATENT DOCUMENTS

| | | | |
|---|---|---|---|
| 4,092,137 | 5/1978 | Howe et al. | 55/337 |
| 4,478,050 | 10/1984 | DiCarlo et al. | 62/470 |
| 4,906,264 | 3/1990 | Szymaszek et al. | 55/337 |

FOREIGN PATENT DOCUMENTS 914341  1/1963  United Kingdom ............... 62/470

Primary Examiner—John Sollecito

[57] ABSTRACT

Oil laden refrigerant is supplied tangentially into an oil separator for a primary removal of oil and then into a coalescer for a secondary removal of oil. Flow between the oil separator and coalescer is controlled by a valve so as to insure that a rapid build up of pressure takes place in the sump to insure adequate lubrication to the compressor.

11 Claims, 3 Drawing Sheets

1

OIL SEPARATOR

BACKGROUND OF THE INVENTION

The present invention is directed to an external oil separator for a refrigeration compressor. There is a natural affinity between oil and refrigerants. As a result, the presence of refrigerant in the lubricating oil may cause outgassing and a failure of the lubricant while oil carried over with the refrigerant interferes with heat transfer and may remove excessive amounts of oil from the oil sump. As exemplified by U.S. Pat. No. 4,788,825, oil separators use an inertial/centrifugal separation by changing the direction of the flow path in conjunction with a coalescer. Because an external oil separator includes a sump, the lubricant may not be readily available for compressor lubrication when the compressor is started due to the draining of lubricant when the compressor is idle, the distance to the sump, the mechanism for supplying lubricant, the viscosity of the lubricant, etc.

SUMMARY OF THE INVENTION

A combination vortex and coalescer oil separator is provided in a single vessel. A relief valve and a differential piston are incorporated into the coalescer. The relief valve is to prevent damage to the coalescer due to an excessive pressure differential. The differential piston is acted upon by the pressure across the compressor and only opens to permit flow of refrigerant through the system after a sufficient pressure is achieved to provide sufficient lubricant. In preferred usage, the present invention will be used in combination with an oil heater and liquid level sensor.

It is an object of this invention to provide an external oil separator.

It is another object of this invention to provide a sufficient pressure to induce oil flow for lubrication upon start up. These objects, and others as will become apparent hereinafter, are accomplished by the present invention.

Basically oil laden refrigerant is supplied tangentially into the oil separator which provides a primary removal of the oil. The refrigerant will then normally pass axially into a coalescer for a secondary oil removal. However, the passage of refrigerant into the coalescer is controlled by a differential piston responsive to the pressure differential across the compressor and only opens when there is a sufficient pressure to feed the oil for lubrication. The coalescer is provided with a relief valve to prevent damage to the coalescer due to its having too high of a resistance.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
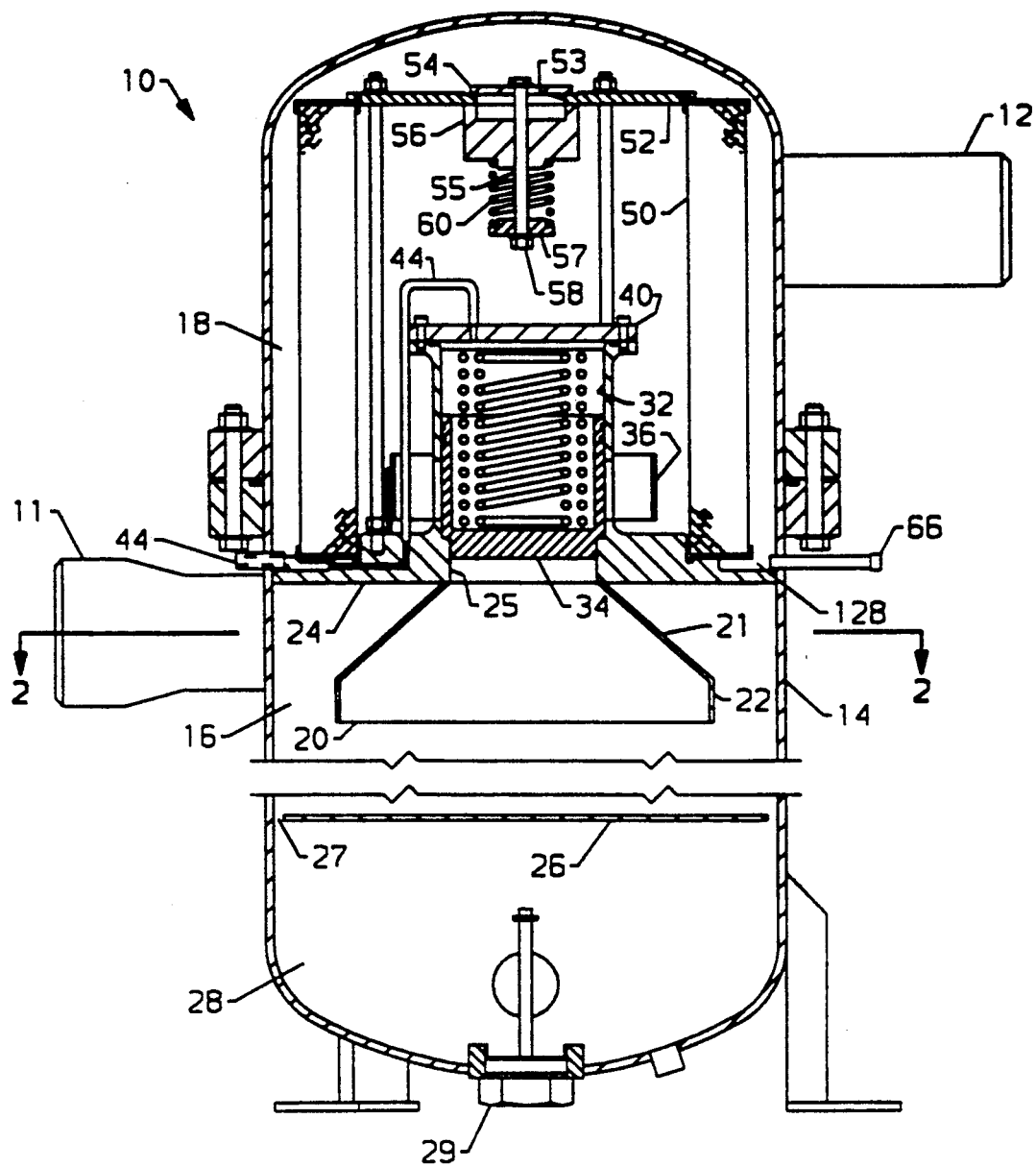
FIG. 1 is a vertical sectional view of the oil separator of the present invention taken along line 1—1 of FIG. 2.
Figure 2:
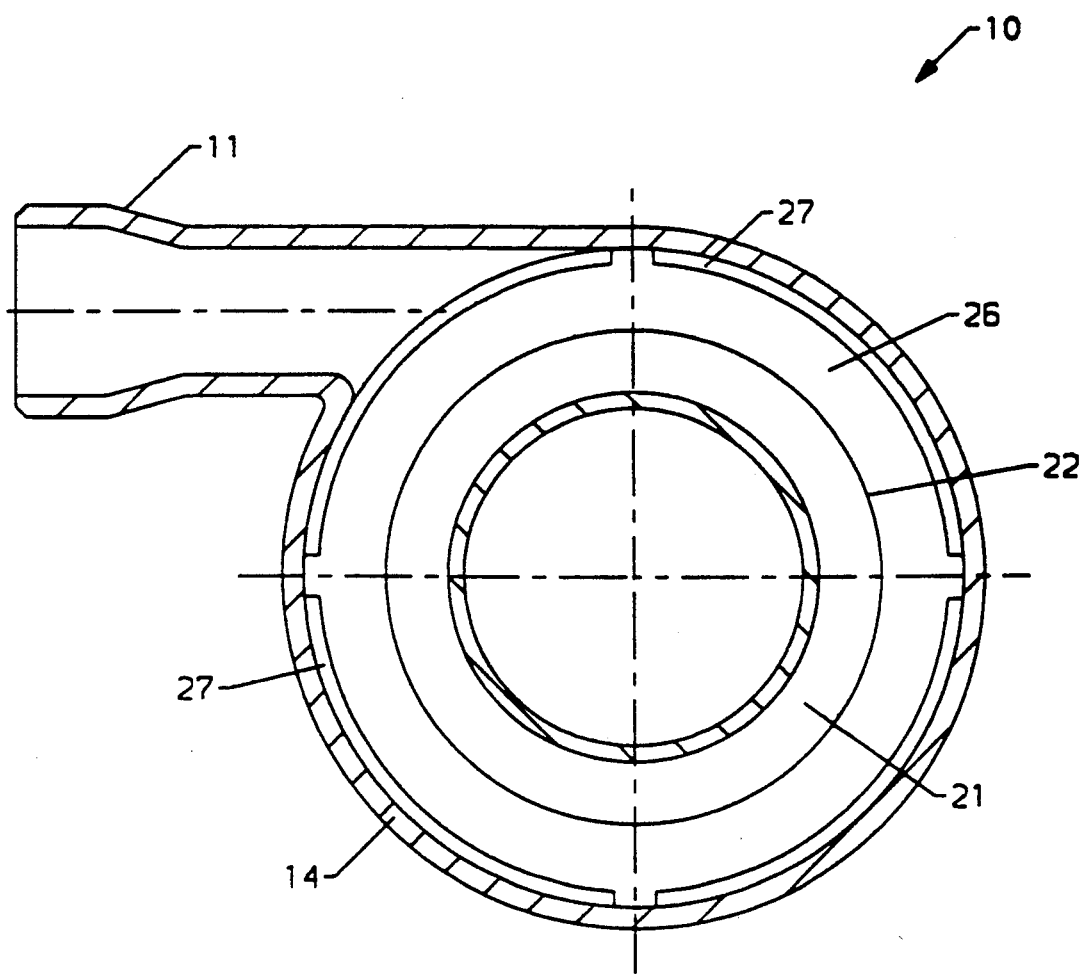
FIG. 2 is a horizontal sectional view taken along line 2—2 of FIG. 1.

In FIGS. 1 and 2 the numeral 10 generally designates an oil separator having a tangential inlet 11 and an outlet 12. Vortex generator 20 includes a frustoconical portion 21 located radially inward of said inlet 11 and a cylindrical portion 22. Vortex generator 20 is secured to divider member 24 which divides shell 14 into a lower, vortex separator portion 16 and an upper coalescer portion 18. Vortex separator portion 16 is separated from sump 28 by solid plate 26 which has a circumferential gap 27 with shell 14 to permit the passage of separated oil into sump 28 while preventing reentrainment of separated oil. Oil flows from sump 28 via line 29 to the compressor (not illustrated) due to the pressure in vortex separator portion 16.

Figure 3:
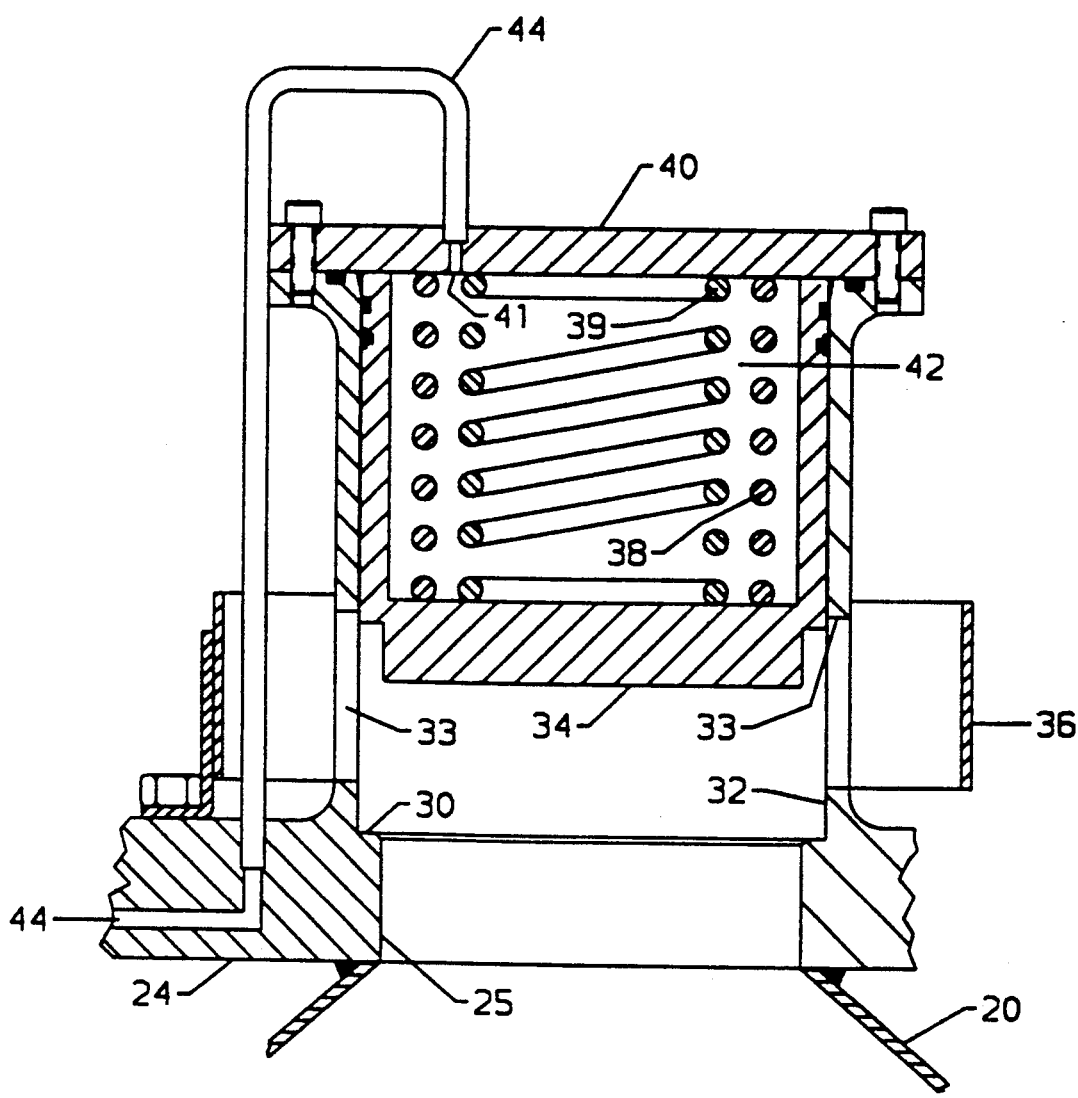
FIG. 3 is an enlarged view of the differential piston in the open position.

Divider member 24 has a port 25 which forms a continuous flow path with cylindrical portion 22 and frustoconical portion 21. As best shown in FIG. 3, port 25 is separated from integral piston bore 32 by annular valve seat 30 which serves as the valve seat for hollow differential piston valve 34. Piston bore 32 is closed at one end by plate 40 and has radial ports 33 which are surrounded by radially spaced, annular deflecting skirt 36. Springs 38 and 39 are located in chamber 42 and provide a seating bias to differential piston valve 34 of a value equal to a desired pressure acting on the oil in sump 28. Port 41 in plate 40 together with line 44 provides fluid communication between the suction side of the compressor (not illustrated) and chamber 42.

Referring specifically to FIG. 1, differential piston valve 34 is located within and is radially separated from cylindrical coalescer 50 which is closed at one end by divider member 24 and at the other end by plate 52. Plate 52 has a port 53 and serves as a seat for relief valve 54 which has a stem 55 serially extending through port 53, spider 56, spring seat 57 and is threadably received in nut 58. Compression spring 60 surrounds valve stem 55 and is located between spider 56 and spring seat 57 so as to provide a seating bias to relief valve 54. Scavenging line 66 provides fluid communication between secondary sump 128 in coalescer portion 18 and the suction of the compressor (not illustrated).

At start up, springs 38 and 39 will tend to bias differential piston valve 34 onto its seat 30 thereby blocking flow between vortex separator section 16 and coalescer section 18. Because chamber 42 is connected to the suction side of the compressor (not illustrated) it will tend to become evacuated. With the discharge of the compressor (not illustrated) being supplied to vortex separator section 16 via inlet 11, the pressure will rapidly build up and act on differential piston valve 34 against the bias of springs 38 and 39 causing it to open. The bias of springs 38 and 39 will insure a sufficient pressure in vortex separator section 16 before valve 34 opens. Because chamber 42 is evacuated, differential piston will bottom out against plate 40 thereby preventing chattering. The buildup of pressure in vortex separator section 16 sufficient to open differential piston valve 34 insures that there is sufficient pressure acting on the oil in sump 28 to supply the oil where needed in the compressor (not illustrated) for lubrication purposes. With a flow path established by the opening of differential piston valve 34, discharge gas from the compressor (not illustrated) laden with oil enters oil separator 10 via tangential inlet 11. Centrifugal forces push the entrained oil droplets to the inner wall of shell 14 in a primary separation and this oil flows downwardly along the inner wall of shell 14, through circumferential gaps 27 into sump 28. Plate 26 isolates the oil in the sump 28 from the gases flowing through the vortex separator section to prevent reentrainment of the separated oil. The plate 26 must be located such that the oil level in sump 28 does not reach plate 26. The oil reduced gas increases in velocity passing serially around and downwardly over the outer portion of vortex generator 20, then passing upwardly through cylindrical portion 22, converging frustoconical portion 21, port 25, and out radial ports 33 into coalescer 50 after striking deflecting skirt 36 which prevents the flow from directly impinging upon coalescer 50. The gas goes through the coalescer 50 which contains fiberous borosilicate with oil coalescing on coalescer 50. The oil free gas then passes from oil separator 10 via outlet 12 to the condenser (not illustrated). Oil coalescing on coalescer 50 passes downwardly on the outer surface of coalescer 50 to the divider member 24 into a secondary sump 128. The oil is drawn from secondary sump 128 via scavenging line 66 which is connected to the suction side of the compressor (not illustrated). Line 66 must be sized properly to withdraw oil from secondary sump 128 without constituting a suction bypass of the compressor.

Relief valve 54 will normally be seated on plate 52 under the bias of spring 60. Spring 60 will have a bias of a value corresponding to a permissible pressure differential across coalescer 50. Gas in coalescer 50 will cause valve 54 to open if the internal pressure on coalescer 50 exceeds the external pressure on coalescer 50 by more than the bias of spring 60. Upon the compression of spring 60 valve 54 will move away from port 53 to allow the equalization of the internal and external pressures of coalescer 50 to prevent any damage thereto.

Although a preferred embodiment of the present invention has been illustrated and described, other modifications will occur to those skilled in the art. It is therefore intended that the present invention is to be limited only by the scope of the appended claims.

What is claimed is:

1. An external oil separator means comprising:
a shell having means therein dividing said shell into a lower, vortex separating section having a sump located at the bottom thereof and an upper coalescer section, a tangential inlet connected to said vortex separating section and an outlet connected to said coalescer section;
said dividing means having a port therein for providing fluid communication between said vortex separating section and said coalescer section;
vortex generator means located in said vortex separating section radially inward of said inlet and extending axially below said inlet and providing a fluid path from said vortex separating section to said port in said dividing means;
coalescer means in said coalescer section in a secured relationship to said dividing means and radially spaced from said port whereby oil laden refrigerant gas entering said inlet flows against said shell causing primary removal of oil from said oil laden refrigerant producing separated refrigerant gas which serially passes through said vortex generator means, said port, said coalescer means and out said outlet.

2. The oil separator means of claim 1 wherein said vortex generator means includes a cylindrical portion and a frustoconical portion with said frustoconical portion being located radially inward of said inlet.

3. The oil separator means of claim 1 further including pressure responsive valve means for controlling flow through said port from said vortex separating section to said coalescing section.

4. The oil separator means of claim 3 wherein said pressure responsive valve means is located within said coalescer means and includes:
a bore;
a differential piston valve movable in said bore between a first position blocking said port and a second position permitting flow through said port into said coalescer means;
plate means coacting with said bore and said differential piston valve to define a chamber;
biasing means in said chamber providing a closing bias to said differential piston valve whereby fluid communication takes place through said port only after a predetermined pressure is achieved in said vortex separating section.

5. The oil separator means of claim 4 further including means for evacuating said chamber whereby said differential piston valve bottoms out against said plate means upon opening.

6. The oil separator means of claim 1 further including relief valve means in said coalescer means whereby a predetermined pressure differential across said coalescer means causes said relief valve means to open to reduce said pressure differential and thereby protect said coalescer means.

7. The oil separator means of claim 1 further including means for permitting oil removed in said primary removal to flow into said sump and for preventing reentrainment of oil in said sump.

8. An external oil separator means comprising:
a shell having means therein dividing said shell into a lower, vortex separating section having a sump located at the bottom thereof and an upper coalescer section, a tangential inlet connected to said vortex separating section and adapted to be connected to the discharge of a refrigerant compressor, and an outlet connected to said coalescer section and adapted to be connected to the condenser of a refrigerating system;
said dividing means having a port therein for providing fluid communication between said vortex separating section and said coalescer section and further including means defining a bore surrounding and axially spaced from said port;
vortex generator means located in said vortex separating section having a frustoconical portion radially inward of said inlet and defining a converging flow path to said port, and a cylindrical portion extending axially below said inlet;
coalescer means in said coalescer section having an annular coalescing portion spaced from and surrounding said means defining said bore and having a first end secured to said dividing means;
first plate means covering a second end of said coalescer means;
valve means in said bore movable between a first position blocking said port and a second position opening said port;
second plate means coacting with said means defining said bore and said valve means to define a chamber;
biasing means in said chamber providing a closing bias to said valve means for closing said port;

whereby oil laden refrigerant gas entering said inlet flows against said shell causing primary removal of oil from said oil laden refrigerant producing separated refrigerant gas which, upon the build up of sufficient pressure, causes said valve means to open against the bias of said biasing means and said separated refrigerant gas serially passes through said vortex generator means, said port, said valve means and said coalescer means and out said outlet.

9. The oil separator means of claim 8 further including means for evacuating said chamber whereby said valve means bottoms out against said second plate means upon opening.

10. The oil separator means of claim 8 further including relief valve means in said coalescer means whereby a predetermined pressure differential across said coalescer means causes said relief valve means to open to reduce said pressure differential and thereby protect said coalescer means.

11. The oil separator means of claim 8 further including means for permitting oil removed in said primary removal to flow into said sump and for preventing reentrainment of oil in said sump.

* * * * *